Jan. 5, 1943.  E. G. BRIDGES  2,307,563
GLASS MOLD OPERATING MECHANISM
Filed Aug. 16, 1939  2 Sheets-Sheet 1
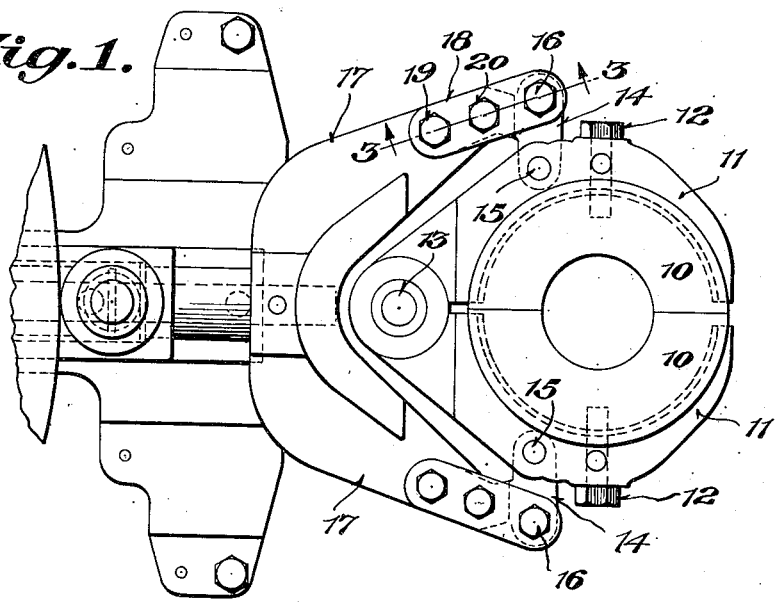
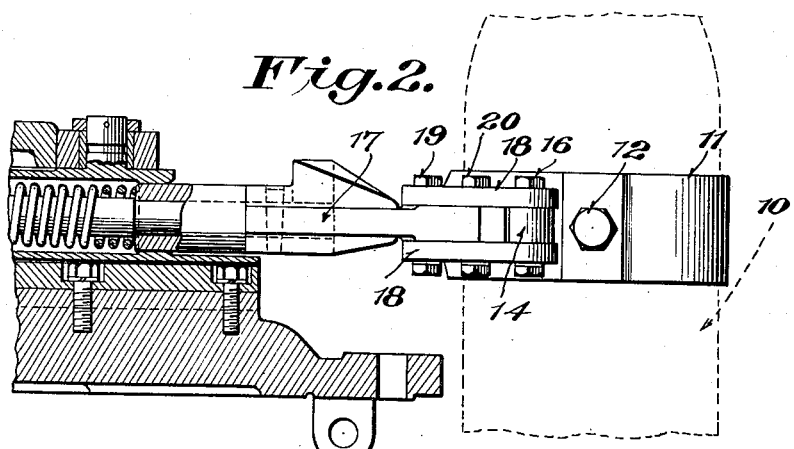
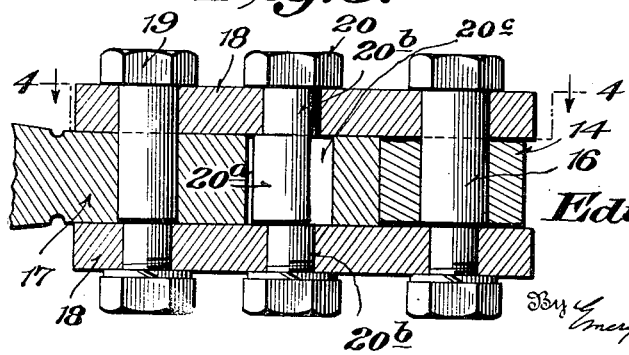
Inventor
Edward G. Bridges,
Attorneys Jan. 5, 1943.  E. G. BRIDGES  2,307,563
GLASS MOLD OPERATING MECHANISM
Filed Aug. 16, 1939  2 Sheets-Sheet 2

Inventor
*Edward G. Bridges,*

Attorneys

Patented Jan. 5, 1943

2,307,563

UNITED STATES PATENT OFFICE 2,307,563

GLASS MOLD OPERATING MECHANISM

Edward G. Bridges, Anderson, Ind., assignor to Lynch Corporation, Anderson, Ind., a corporation of Indiana Application August 16, 1939, Serial No. 290,467

3 Claims. (Cl. 49—42)

The present invention relates to glassware forming machinery and particularly to glass mold operating mechanism for opening and closing molds in which glass is blown or formed.

In the manufacture of glassware, particularly hollow containers, the glass is shaped in molds by pressing, pressing and blowing or blowing and blowing, depending upon the type of ware being made. In many cases the molds are of the hinged or sectional type, which are closed during the shaping of the glass therein but are openable to permit removal of the ware therefrom.

During the shaping of the glass charge in the closed sectional mold, there is considerable pressure against the inner wall of the mold, tending to open them slightly. Obviously the slightly opened molds produce objectionable seams in the ware and possible thin spots in the walls of the ware.

In machines having provision for shaping a charge of glass by blowing, as for example, in fabricating a parison on a narrow neck bottle forming machine, or in finish blowing an article in the finishing mold, the expanding pressure air is heated by the hot plastic glass and develops a very high pressure on the inside of the ware, tending to open the molds, and producing defective ware.

Heretofore the objection has been overcome by the use of mold clamps, possible in certain types of machines. The above stated objection has been partially overcome by the design of linkages connecting the mold halves with the operating member but such mechanism, after a period of wear, does not always hold the mold halves tightly closed.

The principal aim and object of the present invention is to improve mold operating mechanism of the type described, so that the mold sections will be held tightly closed against expanding pressure without the need of auxiliary mold clamps.

Other aims and advantages will be apparent to those skilled in the art in view of the following more detailed description of one embodiment of the invention.

In order better to describe the invention, I have selected for illustration one embodiment of the invention, for example, operating mechanism for a finishing blow mold of a bottle forming machine, although it is to be understood that the invention is applicable to operating mechanism for opening and closing any other types of hinged glass-shaping molds.

In the drawings—

Fig. 1 is a plan view of my improved mold operating mechanism;

Fig. 2 is a side view thereof;

Fig. 3 is a detail vertical sectional view taken on the line 3—3 of Fig. 1; and

Figure 4:
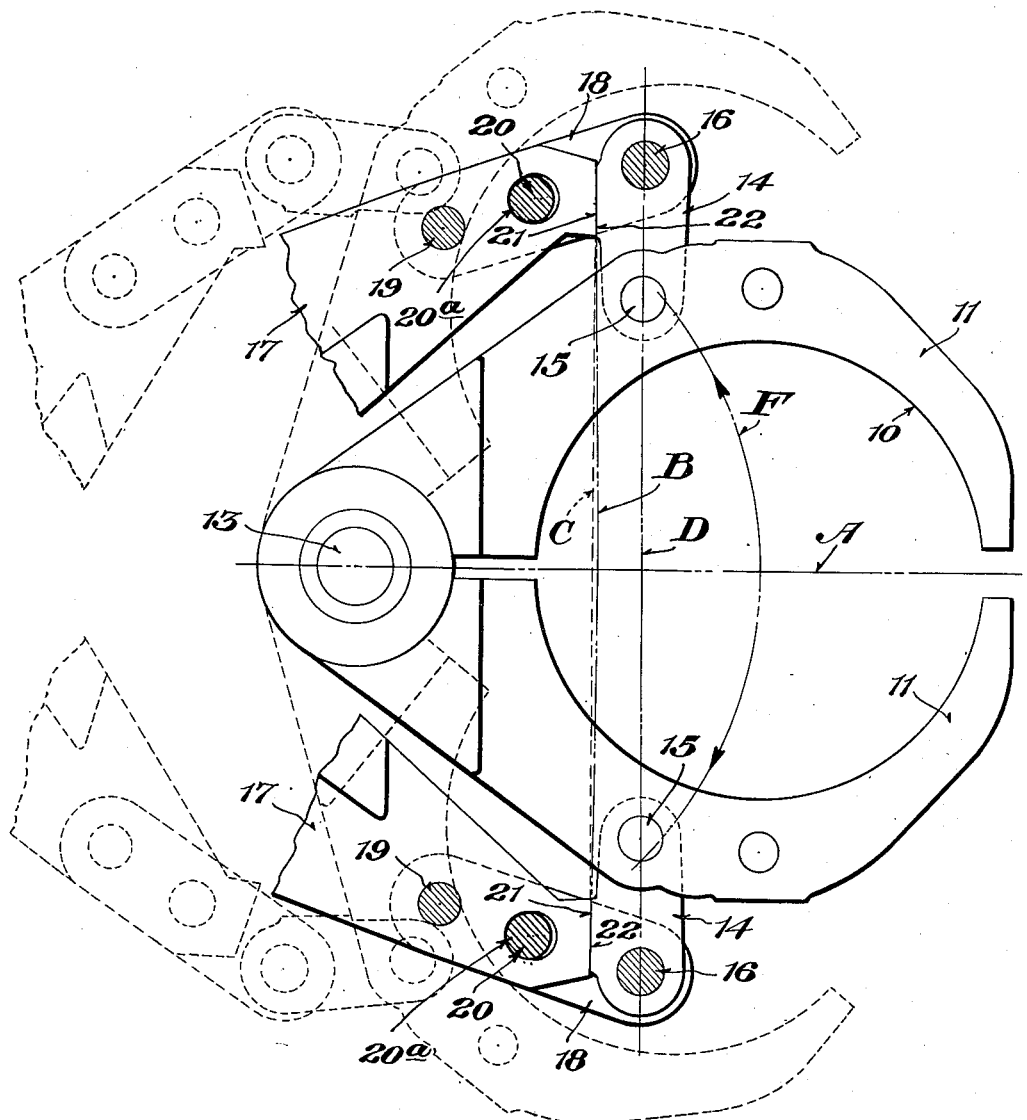
Fig. 4 is a detail horizontal sectional view taken on the line 4—4 of Fig. 3, partially diagrammatic, illustrating the invention, the open position of the mold being shown in dotted lines.

Referring to the illustrated embodiment of the invention shown in the drawings, the shaping mold preferably comprises complementary mold halves 10, secured to mold holders 11 by means of suitable fastenings 12, which holders advantageously may be journalled around a hinge pin 13. The mold holders 11 and the mold halves 10 carried thereby are moved to closed and opened position, as shown in full and dotted lines respectively, Fig. 4, by means of links 14, one end of which is pivotally connected to the mold holders as at 15, and the opposite ends pivotally connected as at 16 to the free ends of a mold operating yoke 17 reciprocably mounted in a suitable bearing carried by a suitable support, for example a mold carrier. The mechanism for moving the operating yoke 17 reciprocably may be of any approved type and construction, and need not be described herein.

The opposite ends of the operating yoke 17 have upper and lower machined faces to which are secured straps 18 by means of a suitable fastening 19. One end of the straps 18 extend beyond the ends of the yoke and are connected to the hinge pin 16. Free movement of the straps relative to the yoke is prevented by means of adjusting pin 20, so that for any adjusted position of the pin 20, the extending ends of the straps 18 are rigid with the yoke 17.

The end faces 21 of the yoke are machined flat to provide stop members, and are machined so that they do not lie in a single plane normal to the axis A of the mold 10 but are so machined that the plane through the inner ends of the faces represented by the line B (Fig. 4) is slightly outward of and nearer the center of the mold 10, than the plane C through the outer ends of the faces. The links 14 have one of their side edges formed with a complementary machined stop 22, said faces 21 and 22 being adapted to be in contact throughout their length when the molds are closed and both links 14 are in alignment and in a plane normal to the center line A of the mold operating mechanism, as one passing through the hinge pin 13 and mold.

When the mold is in its closed position, as shown in Figs. 1 and 4, the links are disposed normal to the center line of the operating mechanism, or hinge pin and mold axis, with both hinge pins 15 and 16 in alignment and lying in a transverse plane inwardly of the mold axis, as indicated by the line D, Fig. 4. Any pressure on the interior of the mold tending to open it, will tend to move the links 14 inwardly, as indicated by the line F, Fig. 4, which movement is opposed by the abutting stop faces 21—22.

The above construction holds the mold halves 10 tightly closed against any internal pressure and the mold sections may be opened only by retracting the yoke 17.

To compensate for the wear on stop faces 21—22, means are provided in the adjustment member 20 for adjusting the straps 18 and accordingly the hinge pin toward and from the axis A of the mold 10. Advantageously this may be accomplished by constructing the member 20 in the form of a bolt and nut (see Fig. 3) pinned together, the bolt having eccentric portions 20ª and 20ᵇ, the portion 20ª being positioned in an elongated slot 20ᶜ in the yoke 17. Obviously, as the bolt 20 is rotated, the portion 20ª may rotate in its bearing in the yoke 17 and the eccentric portions 20ᵇ will be moved toward and from the axis A of the mold. In this manner a tight bearing for the stop faces 21—22 may be maintained when the mold is closed.

The enlarged portions of bolts 19 and 20 have clearance from the bottom strap 18 so that the straps and yoke may be securely clamped together by tightening up on the nuts. The links 14 have a clearance between the opposed straps so that they may pivot on the pins 16 even when the straps and yokes are tightly clamped together.

The invention is not restricted to the particular details of construction shown in the drawings but is intended to embrace as well the novel constructions, combinations and arrangements as fall within the scope of the appended claims.

I claim:

1. A glassware mold operating mechanism comprising a pair of mold holders each having a mold section carrying portion, a hinge for said mold holders spaced from the transverse central axis of said carrying portions, a reciprocably mounted yoke member having its bifurcations embracing said hinge and a portion of said mold holders, a pin mounted beyond the ends of each yoke bifurcation, an adjustable connection between each pin and the adjacent end of a yoke bifurcation, means for adjusting said adjustable connection and pin transversely toward and from a plane passing through the hinge and mold center, a link pivotally connected to each of said pins and to the adjacent mold holder at a point intermediate the hinge and transverse central axis of the carrying portions, said yoke bifurcations being formed with a stop member adapted to engage the associated link when the mold holders are closed for limiting movement of the link to a position normal to the plane passing through the hinge and mold center.

2. A glassware mold operating mechanism comprising a pair of mold holders each having a mold section carrying portion, a hinge for said mold holders spaced from the transverse central axis of said carrying portions, a reciprocably mounted yoke member having its bifurcations embracing said hinge and a portion of said mold holders, a pair of straps hinged to the upper and lower faces of each of said yoke bifurcations, a pin mounted in each pair of straps beyond the ends of said yoke bifurcations, means for adjusting the position of the straps transversely toward and from a plane passing through the hinge and mold center, a link pivotally connected to each of said pins and to the adjacent mold holder at a point intermediate the hinge and transverse central axis of the carrying portions, said yoke bifurcations being formed with a stop member adapted to engage the associated link when the mold holders are closed for limiting movement of the link to a position normal to the plane passing through the hinge and mold center.

3. A glassware mold operating mechanism comprising a pair of mold holders each having a mold section carrying portion, a hinge for said mold holders spaced from the transverse central axis of said carrying portions, a reciprocably mounted yoke member having its bifurcations embracing said hinge and a portion of said mold holders, a pair of straps hinged to the upper and lower faces of each of said yoke bifurcations, a pin mounted in said straps beyond the ends of said yoke bifurcations, an adjusting pin rotatably mounted in said yoke bifurcations and straps and having an eccentric portion for adjusting the straps transversely toward and from a plane passing through the hinge and mold center, a link pivotally connected to each of said pins and to the adjacent mold holder at a point intermediate the hinge and transverse central axis of the carrying portions, said yoke bifurcations being formed with a stop member adapted to engage the associated link when the mold holders are closed for limiting movement of the link to a position normal to a plane passing through the pin and mold center.

EDWARD G. BRIDGES.